United States Patent
McGee et al.

(10) Patent No.: US 7,138,444 B2
(45) Date of Patent: Nov. 21, 2006

(54) CORROSION RESISTANT FILMS BASED ON ETHYLENICALLY UNSATURATED MONOMER MODIFIED EPOXY EMULSIONS

(75) Inventors: John D. McGee, Troy, MI (US); Brian D. Bammel, Rochester Hills, MI (US); Zhiqi Yang, Troy, MI (US)

(73) Assignee: Henkel Kommanditgesellschaft auf Atkien (Henkel KGaA) (DE)

( * ) Notice: Subject to any disclaimer, the term of this patent is extended or adjusted under 35 U.S.C. 154(b) by 174 days.

(21) Appl. No.: 10/620,087

(22) Filed: Jul. 14, 2003

(65) Prior Publication Data

US 2004/0043155 A1    Mar. 4, 2004

Related U.S. Application Data

(60) Provisional application No. 60/396,055, filed on Jul. 15, 2002.

(51) Int. Cl.
*C08L 63/00*    (2006.01)
(52) U.S. Cl. ...................... 523/414; 523/400; 523/402; 525/523; 525/529; 525/531
(58) Field of Classification Search ................ 525/523, 525/529, 531, 532
See application file for complete search history.

(56) References Cited

U.S. PATENT DOCUMENTS

| | | | |
|---|---|---|---|
| 3,063,877 A | 11/1962 | Schuffman |
| 3,585,084 A | 6/1971 | Steinbrecher |
| 3,592,699 A | 7/1971 | Steinbrecher |
| 3,674,567 A | 7/1972 | Bradley et al. |
| 3,709,743 A | 1/1973 | Dalton et al. |
| 3,791,431 A | 2/1974 | Steinbrecher et al. |
| 3,795,546 A | 3/1974 | Hall et al. |
| 4,028,294 A | 6/1977 | Brown et al. |
| 4,030,945 A | 6/1977 | Hall et al. |
| 4,108,817 A | 8/1978 | Lochel, Jr. |
| 4,178,400 A | 12/1979 | Lochel, Jr. |
| 4,180,603 A | 12/1979 | Howell, Jr. |
| 4,186,226 A | 1/1980 | Smith |
| 4,212,781 A | 7/1980 | Evans et al. |
| 4,233,197 A | 11/1980 | Howell, Jr. |
| 4,234,704 A | 11/1980 | Sakanaka et al. |
| 4,242,379 A | 12/1980 | Hall et al. |
| 4,243,704 A | 1/1981 | Hall et al. |
| 4,285,847 A | 8/1981 | Ting |
| 4,289,826 A | 9/1981 | Howell, Jr. |
| 4,308,185 A | 12/1981 | Evans et al. |
| 4,313,861 A | 2/1982 | Bassett et al. |
| 4,347,172 A | 8/1982 | Nishida et al. |
| 4,399,241 A | 8/1983 | Ting et al. |
| 4,413,073 A | 11/1983 | Gibson et al. |
| 4,442,246 A | 4/1984 | Brown et al. |
| 4,443,568 A | 4/1984 | Woo |
| 4,482,671 A | 11/1984 | Woo et al. |
| 4,482,673 A | 11/1984 | Brown et al. |
| 4,487,859 A | 12/1984 | Martino |
| 4,487,860 A | 12/1984 | Winner et al. |
| 4,487,861 A | 12/1984 | Winner |
| 4,503,173 A | 3/1985 | Martino et al. |
| 4,522,961 A | 6/1985 | Martino et al. |
| 4,522,962 A | 6/1985 | Abbey et al. |
| 4,547,535 A | 10/1985 | Brown et al. |
| 4,600,754 A | 7/1986 | Winner |
| 4,612,209 A | 9/1986 | Forgo et al. |
| 4,636,264 A | 1/1987 | Schellenberg et al. |
| 4,636,265 A | 1/1987 | Fischer et al. |
| 4,800,106 A | 1/1989 | Broadbent |
| 4,859,721 A | 8/1989 | Oberkobusch et al. |
| 4,874,673 A | 10/1989 | Donovan et al. |
| 4,929,724 A | 5/1990 | Engbert et al. |
| 5,177,122 A | 1/1993 | Shih |
| 5,252,637 A | 10/1993 | Craun et al. |
| 5,342,694 A | 8/1994 | Ahmed et al. |
| 5,472,999 A | 12/1995 | Kudoh et al. |
| 5,500,460 A | 3/1996 | Ahmed et al. |
| 5,708,058 A | 1/1998 | Pfeil et al. |
| 5,824,424 A | 10/1998 | Haneishi et al. |
| 5,981,627 A | 11/1999 | Shih et al. |
| 6,096,806 A | 8/2000 | Mueller et al. |
| 6,525,112 B1 | 2/2003 | Bammel |

(Continued)

FOREIGN PATENT DOCUMENTS

DE    19536381    4/1997

(Continued)

OTHER PUBLICATIONS

U.S. Appl. No. 09/964,181.

*Primary Examiner*—Michael J. Feely
(74) *Attorney, Agent, or Firm*—Connolly Bove Lodge & Hutz LLP

(57) ABSTRACT

The invention provides high solids epoxy-based autodeposition coating materials and a means to obtain the high solids epoxy-based autodeposition coating materials that eliminates/minimizes the need for process solvents. An epoxy pre-polymer is used. The epoxy pre-polymer is combined with ethylenically unsaturated monomer, as an alternative to organic solvent, to yield an epoxy-monomer blend, which may be blended with other coating components and additives. The resulting blend is then dispersed in water with surfactant and the ethylenically unsaturated monomer is polymerized (in the presence of other formulation components) to yield a dispersion. The dispersion may then be used as one component of a coating formulation. The coating formulation can then be applied to materials and cured to form a final coating.

39 Claims, No Drawings

U.S. PATENT DOCUMENTS

| | | |
|---|---|---|
| 6,613,387 B1 | 9/2003 | Agarwal et al. |
| 6,645,633 B1 | 11/2003 | Weller et al. |
| 6,989,411 B1 | 1/2006 | Bammel et al. |
| 2002/0011309 A1 | 1/2002 | Agarwal et al. |
| 2002/0102356 A1 | 8/2002 | Agarwal et al. |
| 2005/0065242 A1* | 3/2005 | McGee et al. ............... 523/402 |

FOREIGN PATENT DOCUMENTS

| | | |
|---|---|---|
| EP | 0 770 635 | 5/1997 |
| EP | 0-921140 | 6/1999 |
| EP | 0 933384 A1 | 8/1999 |
| EP | 1193298 | 4/2002 |
| JP | 63-97226 A | 4/1988 |
| WO | WO-91/05023 A1 | 4/1991 |
| WO | WO 99/30841 | 6/1999 |
| WO | WO 00/17269 | 3/2000 |
| WO | WO 00/71337 | 11/2000 |
| WO | WO-03/026888 A1 | 4/2003 |
| WO | WO-03/042275 A1 | 5/2003 |
| WO | WO-04/007443 A2 | 1/2004 |

* cited by examiner

CORROSION RESISTANT FILMS BASED ON ETHYLENICALLY UNSATURATED MONOMER MODIFIED EPOXY EMULSIONS Priority is claimed under 35 USC §119(e) from U.S. Provisional Application Ser. No. 60/396,055 filed Jul. 15, 2002; the entirety of which is hereby incorporated by reference.

FIELD OF THE INVENTION

The present invention relates generally to epoxy dispersions providing corrosion resistant films and to a process for making high solids, epoxy-based coating materials, more particularly to ethylenically unsaturated monomer modified epoxy dispersions and coating baths providing corrosion resistant films based on application by autodeposition.

BACKGROUND OF THE INVENTION

Autodeposition has been in commercial use on steel for about thirty years and is now well established for that use. For details, see for example, U.S. Pat. Nos. 3,063,877; 3,585,084; 3,592,699; 3,674,567; 3,791,431; 3,795,546; 4,030,945; 4,108,817; 4,178,400; 4,186,226; 4,242,379; 4,234,704; 4,636,264; 4,636,265; 4,800,106; and 5,342,694. The disclosures of all these patents are hereby incorporated by reference. Epoxy resin-based autodeposition coating systems are described in U.S. Pat. No. 4,180,603 (Howell. Jr.); U.S Pat. No. 4,289,826 (Howell Jr.); U.S. Pat. No. 5,500,460 (Ahmed et al.); and International Publication Number WO 00/71337, the teachings of each of which are incorporated by reference.

Autodeposition compositions are usually in the form of a liquid, usually aqueous solutions, emulsions or dispersions in which active metal surfaces of inserted objects are coated with an adherent resin or polymer film that increases in thickness the longer the metal remains in the bath, even though the liquid is stable for a long time against spontaneous precipitation or flocculation of any resin or polymer, in the absence of contact with the active metal. When used in the autodeposition process, the composition when cured forms a polymeric coating. "Active metal" is defined as metal that spontaneously begins to dissolve at a substantial rate when introduced into the liquid solution or dispersion. Such compositions, and processes of forming a coating on a metal surface using such compositions, are commonly denoted in the art, and in this specification, as "autodeposition" or "autodepositing" compositions, dispersions, emulsions, suspensions, baths, solutions, processes, methods or a like term. Autodeposition is often contrasted with electrodeposition. Although each can produce adherent films with similar performance characterisitics, the dispersions from which they are produced and the mechanism by which they deposit are distinctly different. Electrodeposition requires that metal or other objects to be coated be connected to a source of direct current electricity for coating to occur. No such external electric current is used in autodeposition.

Prior epoxy dispersions used for autophoretic application are generally made by preparing low solids solutions of advanced epoxy resin in organic solvent(s). The epoxy resin in organic solvent(s) may be blended with other coating components and additives. The resulting mixture is dispersed in water with surfactant and is then mechanically dispersed to a desired particle size. Because a high concentration of solvent is undesirable in an autodepositing coating bath, these solvent-rich emulsions require removal of solvent by distillation techniques known in the art. The dispersion may then be used as a component of a coating bath. The dispersion, when autodeposited on a metal surface and cured, forms a polymeric coating.

Thus, there is a need in the art for high solids, epoxy-based autodeposition coating materials that eliminate and/or minimize the need for process solvents, which adversely affect manufacturing costs. This need is especially pronounced in thermoset epoxy-based autodeposition formulations utilizing crosslinking agents where process solvent requirements are greatest. There is also a need in the art for epoxy-based thermosetting coatings, which provide high degrees of film coverage over thin edges of the substrate following cure. Shortcomings of the prior art stem from flow away from substrate edges as viscosity of the applied film is reduced as the film is heated in the curing process. There is also a need in the art for a process to obtain these high solids, epoxy-based autodepositing coating materials. Finally, there is also a need in the art for high solids, epoxy-based autodeposition coating materials that are improved with respect to edge protection, mechanical and adhesive properties.

SUMMARY OF THE INVENTION

The invention provides a means to obtain high solids epoxy-based autodeposition coating materials and eliminates/minimizes the need for process solvents. An epoxy pre-polymer is used. The epoxy pre-polymer is combined with ethylenically unsaturated monomer, as an alternative to organic solvent, to yield an epoxy-monomer blend, which may be blended with other coating components and additives. The resulting blend is then dispersed in water with surfactant and the ethylenically unsaturated monomer is polymerized (optionally in the presence of other formulation components) to yield a dispersion. The dispersion may then be used as one component of a coating formulation. The coating formulation can then be applied to an active metal substrate and cured to form a final coating.

The present invention solves the problems of the related art by providing a process to obtain high solids epoxy-based autodepositing coating materials wherein the process eliminates/minimizes the need for process solvents, which adversely affect manufacturing cost. The invention also produces high solids, epoxy-based dispersions that are capable of being used as a primary material that forms a coating film or as an additive component of a coating formulation that enhances the properties provided by the coating. The invention also provides stable epoxy-based dispersions containing crosslinking agents that have a relatively long shelf life. The invention also provides coatings that are improved with respect to mechanical and adhesive properties. The invention further provides a coating that may be applied using a variety of techniques such as autodeposition, spray, electrostatic, roll, and brush application. The present invention results in dispersions that are stable and autodeposit a coating in an autodeposition bath environment.

Typical film properties include good anti-corrosive properties; good humidity, moisture and chemical resistance; and good appearance.

In accordance with the purpose of the invention, as embodied and broadly described herein, the invention comprises a process for making an epoxy dispersion, the process comprising the steps of: (a) dissolving and/or reducing an epoxy pre-polymer with at least one ethylenically unsaturated monomer to form a mixture; (b) dispersing the mixture of step (a) in water with at least one surfactant to form a fine particle dispersion; and (c) polymerizing the at least one ethylenically unsaturated monomer contained in the fine particle dispersion to form an epoxy dispersion, wherein at least one water soluble initiator and/or at least one organic soluble initiator is added prior to step (c).

Further, in accordance with the purpose of the invention, as embodied and broadly described herein, the invention comprises a process for making an epoxy dispersion, the process comprising the steps of: (a) dissolving and/or reducing an epoxy pre-polymer with at least one ethylenically unsaturated monomer to form a mixture; (b) dispersing the mixture of step (a) in water with at least one surfactant to form a fine particle dispersion; and (c) polymerizing the at least one ethylenically unsaturated monomer contained in the fine particle dispersion to form an epoxy dispersion, wherein at least one water soluble initiator and/or at least one organic soluble initiator is added prior to step (c) and wherein at least one latent curing agent such as, for example, a blocked isocyanate is incorporated into the mixture before the at least one ethylenically unsaturated monomer is polymerized.

Further, in accordance with the purpose of the invention, as embodied and broadly described herein, the invention comprises a process for making an epoxy dispersion, the process comprising the steps of: (a) dissolving and/or reducing an epoxy pre-polymer with at least one ethylenically unsaturated monomer to form a mixture; (b) dispersing the mixture of step (a) in water with at least one surfactant to form a fine particle dispersion; and (c) polymerizing the at least one ethylenically unsaturated monomer contained in the fine particle dispersion to form an epoxy dispersion, wherein at least one water soluble initiator and/or at least one organic soluble initiator is added prior to step (c) and at least one phosphate ester monomer is added after step (b) and prior to or during step (c).

Further, in accordance with the purpose of the invention, as embodied and broadly described herein, the invention comprises a stable autodepositing epoxy dispersion comprising (a) an epoxy pre-polymer; (b) at least one ethylenically unsaturated monomer polymerized through a heterophase polymerization process; and (c) at least one latent curing agent, wherein the epoxy dispersion further comprises dispersion particles and components (a), (b), and (c) are all present at the same time in one or more of the dispersion particles. The invention also comprises an autodepositing coating composition comprising this stable autodepositing epoxy dispersion, water, and at least one autodeposition accelerator.

Further, in accordance with the purpose of the invention, as embodied and broadly described herein, the invention comprises a stable autodepositing epoxy dispersion comprising (a) an epoxy pre-polymer; and (b) at least one ethylenically unsaturated monomer polymerized through a heterophase polymerization process, wherein at least one ethylenically unsaturated monomer is a phosphate ester monomer and the epoxy dispersion further comprises dispersion particles and components (a) and (b) are both present in one or more of the dispersion particles. The invention also comprises an autodepositing coating composition comprising this stable autodepositing epoxy dispersion, water, and at least one autodeposition accelerator.

Further in accordance with the purpose of the invention, as embodied and broadly described herein, the invention comprises an epoxy dispersion produced by: (a) dissolving and/or reducing an epoxy pre-polymer with at least one ethylenically unsaturated monomer to form a mixture; (b) dispersing the mixture of step (a) in water with at least one surfactant to form a fine particle dispersion; and (c) polymerizing the at least one ethylenically unsaturated monomer contained in the fine particle dispersion to form an epoxy dispersion, wherein at least one water soluble initiator and/or at least one organic soluble initiator is added prior to step (c) and wherein at least one latent curing agent such as, for example, a blocked isocyanate is incorporated into the mixture before the at least one ethylenically unsaturated monomer is polymerized.

Further in accordance with the purpose of the invention, as embodied and broadly described herein, the invention comprises an autodepositing coating composition comprising an epoxy dispersion of the invention and at least one autodeposition accelerator component. The autodepositing coating composition provides for unique coating materials.

The type and concentration of epoxy pre-polymer and ethylenically unsaturated monomer used, as well as the type of initiator, can be varied to achieve specific performance properties such as corrosion resistance, flexibility, edge protection, and appearance properties such as gloss and smoothness. The degree of grafting, if any, to the epoxy pre-polymer which occurs during the radical polymerization offers a means to control coating gloss via formulation. The type and concentration of ethylenically unsaturated monomer used can also be exploited as a means to provide improved compatibility with various pigmentation types.

Further in accordance with the purpose of the invention, as embodied and broadly described herein, another novel aspect of the invention stems from heterophase polymerization of ethylenically unsaturated monomer. Various heterophase polymerization techniques are widely known in the art. Emulsion polymerization processes represent the most common of such processes. Heterophase polymerization provides a means to achieve high molecular weight polymer chains. Molecular weights of common latexes are typically greater than 1 million Daltons. Within the invention, creation of similar high molecular weight polymer chains within the dispersion particle in the presence of relatively low molecular weight epoxy precursors or pre-polymers, provides unique coating properties. One particular benefit is improved film coverage of cured coating over the substrate edges following cure.

Further scope of applicability of the present invention will become apparent from the detailed description given hereinafter. However, it should be understood that the detailed description and specific examples, while indicating embodiments of the invention, are given by way of illustration only, because various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

DETAILED DESCRIPTION OF THE PREFERRED EMBODIMENTS

The following detailed description does not limit the invention. Instead, the scope of the invention is defined by the appended claims and equivalents thereof.

In one embodiment the invention comprises a process for making an epoxy dispersion, the process comprising the steps of: (a) dissolving and/or reducing an epoxy pre-polymer with at least one ethylenically unsaturated monomer to form a mixture; (b) dispersing the mixture of step (a)

in water with at least one surfactant to form a fine particle dispersion; and (c) polymerizing the at least one ethylenically unsaturated monomer contained in the fine particle dispersion to form an epoxy dispersion, wherein at least one water soluble initiator and/or at least one organic soluble initiator is added prior to step (c).

In another embodiment, the invention comprises a process for making an epoxy dispersion, the process comprising the steps of: (a) dissolving and/or reducing an epoxy pre-polymer with at least one ethylenically unsaturated monomer to form a mixture; (b) dispersing the mixture of step (a) in water with at least one surfactant to form a fine particle dispersion; and (c) polymerizing the at least one ethylenically unsaturated monomer contained in the fine particle dispersion to form an epoxy dispersion, wherein at least one water soluble initiator and/or at least one organic soluble initiator is added prior to step (c) and wherein at least one latent curing agent such as, for example, a blocked isocyanate is incorporated into the mixture before the at least one ethylenically unsaturated monomer is polymerized.

In another embodiment, the invention comprises a process for making an epoxy dispersion, the process comprising the steps of: (a) dissolving and/or reducing an epoxy pre-polymer with at least one ethylenically unsaturated monomer to form a mixture; (b) dispersing the mixture of step (a) in water with at least one surfactant to form a fine particle dispersion; and (c) polymerizing the at least one ethylenically unsaturated monomer contained in the fine particle dispersion to form an epoxy dispersion, wherein at least one water soluble initiator and/or at least one organic soluble initiator is added prior to step (c) and at least one phosphate ester monomer is added after step (b) and prior to or during step (c).

In another embodiment, the invention comprises a stable autodepositing epoxy dispersion comprising (a) an epoxy pre-polymer; (b) at least one ethylenically unsaturated monomer polymerized through a heterophase polymerization process; and (c) at least one latent curing agent, wherein the epoxy dispersion further comprises dispersion particles and components (a), (b), and (c) are all present at the same time in one or more of the dispersion particles. The invention also comprises an autodepositing coating composition comprising this stable autodepositing epoxy dispersion, water, and at least one autodeposition accelerator.

In another embodiment, the invention comprises a stable autodepositing epoxy dispersion comprising (a) an epoxy pre-polymer; and (b) at least one ethylenically unsaturated monomer polymerized through a heterophase polymerization process, wherein at least one ethylenically unsaturated monomer is a phosphate ester monomer and the epoxy dispersion further comprises dispersion particles and components (a) and (b) are both present at the same time in one or more of the dispersion particles. The invention also comprises an autodepositing coating composition comprising this stable autodepositing epoxy dispersion, water, and at least one autodeposition accelerator.

In another embodiment, the invention comprises an epoxy dispersion produced by: (a) dissolving and/or reducing an epoxy pre-polymer with at least one ethylenically unsaturated monomer to form a mixture; (b) dispersing the mixture of step (a) in water with at least one surfactant to form a fine particle dispersion; and (c) polymerizing the at least one ethylenically unsaturated monomer contained in the fine particle dispersion to form an epoxy dispersion, wherein at least one water soluble initiator and/or at least one organic soluble initiator is added prior to step (c) and wherein at least one latent curing agent such as, for example, a blocked isocyanate is incorporated into the mixture before the at least one ethylenically unsaturated monomer is polymerized.

In another embodiment, the invention comprises an autodepositing coating composition comprising one or more epoxy dispersions of the invention and at least one autodeposition accelerator component. The autodepositing coating composition provides for unique coating materials.

In another embodiment, the invention comprises a process for making an autodepositing coating composition comprising combining an epoxy dispersion of the invention and at least one autodeposition accelerator component.

In another embodiment, the invention comprises an autodepositing coating composition comprising an epoxy dispersion of the invention and at least one autodeposition accelerator component. The autodepositing coating composition provides for unique coating materials.

In the present invention, an epoxy pre-polymer is combined with at least one ethylenically unsaturated monomer, as an alternative to a solvent, such as an organic solvent, to form a mixture of epoxy pre-polymer and ethylenically unsaturated monomer prior to being dispersed in water. Depending on the relative amounts of epoxy-prepolymer and ethylenically unsaturated monomer used, a solvent may be used in conjunction with the ethylenically unsaturated monomer to dissolve or reduce the epoxy pre-polymer. Other desired coating components, curing agents, and additives may be added to the epoxy pre-polymer-ethylenically unsaturated monomer mixture before, during, or after it is formed. The resulting mixture of epoxy pre-polymer, ethylenically unsaturated monomer and any other desired coating components are then dispersed in water.

In the context of the present invention the term dissolving, in addition to its traditional meaning, also includes situations where the viscosity the pre-polymer is "reduced" via addition of ethylenically unsaturated monomer or solvent to form a mixture, as opposed to being completely dissolved by it or into it. The term dissolving does not infer that the resulting mixture of epoxy pre-polymer, ethylenically unsaturated monomer, and any added components must result in a homogeneous solution or mixture. Therefore in some embodiments, the epoxy pre-polymer is not completely dissolved in the traditional sense, but rather has had its viscosity reduced such that it forms a mixture with ethylenically unsaturated monomer and any added components. In some cases, the blend of ethylenically unsaturated monomer, epoxy pre-polymer and any additional components may form hazy non-viscous mixtures.

The relative amounts of epoxy-prepolymer and ethylenically unsaturated monomer can be varied widely to yield a variety of performance attributes. Typical weight ratios of epoxy-prepolymer to ethylenically unsaturated monomer are about 90:10 to about 15:85. In another embodiment, weight ratios of epoxy-pre-polymer to ethylenically unsaturated monomer are about 70:30 to about 30:70. In cases where the amount of ethylenically unsaturated monomer used is high, no process solvent is required to achieve dispersion. In cases where the amount of ethylenically unsaturated monomer is low, conventional solvent may be useful to facilitate dispersion. In such cases the level required is significantly less than would be required without the use of ethylenically unsaturated monomer.

The epoxy pre-polymers useful in the present invention can be based on conventional epoxy resins. Such epoxy resins are well known substances and are described, for example, in the chapter entitled "Epoxy Resins" in Volume 6 of The Encyclopedia of Polymer Science and Engineering (Second Edition).

Epoxy resins are often described by the type of central organic moiety or moieties to which the 1,2-epoxy moieties are attached. Non-exclusive examples of such central moieties are those derived from bisphenol A, bisphenol F, novolak condensates of formaldehyde with phenol and substituted phenols, the condensates containing at least two aromatic nuclei; triazine; hydantoin; and other organic molecules containing at least two hydroxyl moieties each, in each instance with as many hydrogen atoms deleted from hydroxy moieties in the parent molecule as there are epoxy moieties in the molecules of epoxy resin. Optionally, the 1,2-epoxy moieties may be separated from the central moieties as defined above by one or more, preferably only one methylene group. Oligomers of such monomers, either with themselves or with other organic molecules containing at least two hydroxyl moieties each, may also serve as the central organic moiety.

Non-exclusive examples of epoxy resins useful for the present invention include glycidyl ethers of a polyhydric phenol, such as bisphenol A (a particularly preferred species of polyhydric phenol), bisphenol F, bisphenol AD, catechol, resorcinol, and the like.

Primarily for reasons of economy and commercial availability, it is generally preferred to utilize epoxy resins derived from bisphenol A in this invention. More particularly, epoxy moiety containing molecules utilized in this invention preferably conform to the general formula:

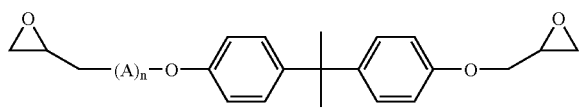

where A=

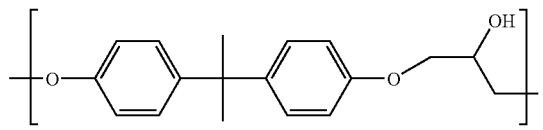

And "n" is an integer from 0 to 50. If such epoxy resins are to be used directly as the epoxy pre-polymer component of the present invention, n is preferably an integer within the range from 1–30 so that each molecule contains at least one hydroxyl group. Commercially available epoxy resins of this type are normally mixtures of molecules having somewhat different n values and different numbers of epoxy groups. Preferably, the epoxy resin mixture used has a number average molecular weight in the range of from about 350 to about 5,000, or in the range from about 400 to about 3000. Preferably, the average number of epoxide groups per molecule in the epoxy resin mixture is from about 1.7 to about 2.5, more preferably from about 1.9 to about 2.1. The epoxy resin mixture may contain resin molecules in which n=0.

In another embodiment, the epoxy pre-polymer comprises the reaction product of aromatic polyepoxide and at least one co-reactant having one or more epoxy-reactive groups. The ratio of epoxy and epoxy reactive groups are chosen such that epoxy endgroups remain once the reaction is essentially complete. Preferred molecular equivalent weight ranges for such pre-polymers range from 450–2000 grams/equivalent epoxy based on solids. In one embodiment the co-reactant containing epoxy reactive groups also comprises ethylenic unsaturation. Such co-reactants offer one of several means to control degrees of grafting, if any, onto the epoxy pre-polymer during the radical polymerization. Non-exclusive examples of such co-reactants include unsaturated acid esters such as acrylic and methacrylic acid, and unsaturated acids and unsaturated anhydrides such as maleic acid and maleic anhydride.

In one embodiment the pre-polymer comprises an additional monofunctional species that is capable of reacting with some of the epoxy functional groups of the pre-polymer. The resulting pre-polymer has a lower viscosity and is therefore easier to process into a dispersion with a desired particle size. Non-exclusive examples of such monofunctional species include phenol, substituted phenols such as nonylphenol, and monocarboxylic acids such as alkylcarboxylic acids Catalysts capable of accelerating the reaction of epoxy include, for example, phosphines, amines, quaternary ammonium salts, and quaternary phosphonium salts. Other basic substances may be utilized if so desired in order to reduce the reaction time and/or temperature required. The reaction may be carried out in the presence of a solvent such as, for example, an inert organic solvent (e.g., aromatic hydrocarbons, ketones). It is recognized that in certain embodiments of the invention, some portions of the starting materials may remain unreacted and thus may be present in such form when the reaction product is used in the autodeposition composition described herein.

Suitable ethylenically unsaturated monomers include but are not limited to vinyl aromatic hydrocarbons such as styrene and substituted styrenes, vinyl aliphatic hydrocarbons, ethylenically unsaturated acids such as acrylic and methacrylic acid as well as alkyl and hydroxy-alkyl esters of such acids. Non-exclusive examples include butyl acrylate, methyl methacrylate, and hydroxyethyl methacrylate. Acrylonitrile, methacrylonitrile, acrylamide, and methacrylamide are also suitable.

In one embodiment, ethylenically unsaturated monomers with anionic functionality are used. Anionic functional monomers, when co-polymerized into an emulsion or aqueous solution polymers, provide a "bound" source of ionic charges to effectively stabilize the emulsion polymer particles both during polymerization and subsequent formulation into autodeposition compositions. One advantage offered is to minimize or eliminate the use of an external surfactant. In addition, these anionic functional monomers may provide a "bound" source of sulfate or sulfonate groups to the polymer necessary for autodeposition film formation to occur. Examples of suitable anionic functional monomers include, but are not limited to, 2-sulfoethyl methacrylate, 2-acrylamido-2-methylpropanesulfonic acid, styrenesulfonic acid, vinylphosphonic acid, phosphate monomers such as PAM-100 and PAM-200 phosphate ester monomers available from Rhodia and corresponding salts of these monomers.

In one embodiment, phosphate monomers such as PAM-100 and PAM-200 available from Rhodia and corresponding salts of these monomers are used as a portion of the ethylenically unsaturated monomer. It has been found that the use of phosphate monomers such as PAM-100 and PAM-200 provide surprising improvements in mechanical and adhesive properties. For example, paint adhesion to metal is improved and the reverse impact performance is significantly improved. It is generally preferred for the phosphate monomer(s) to be added after dispersion of the epoxy pre-polymer and other ethylenically unsaturated monomer and before or during polymerization of the monomer.

In another embodiment of the present invention, hydroxyl functional ethylenically unsaturated monomer is used. The use of hydroxyl functional ethylenically unsaturated monomer provides for a dispersion that has greater solvent resistance when used in conjunction with hydroxyl reactive crosslinking or curing agents. The improvement in solvent resistance is observed in the applied coating after curing. The improvement stems from crosslinking between hydroxyl groups on the acrylic chain and crosslinking agent utilized in the dispersion. Non-exclusive examples of hydroxyl functional ethylenically unsaturated monomer include 2-hydroxyethyl methacrylate, hydroxyethyl acrylate, and hydroxy propyl methacrylate.

Essentially any type of free radical generator can be used to initiate polymerization of the monomers. For example, free radical generating chemical compounds, ultraviolet light or radiation can be used. A radical initiator may be added to facilitate the polymerization of the ethylenically unsaturated monomer within the epoxy containing micelle of the dispersion. Relative degrees of grafting, if any, between epoxy pre-polymer and polymerized monomer can be achieved to provide for specific molecular weights and specific performance ends by careful selection of initiator type. Initiators may be added at various points in the process of forming the dispersion. In one embodiment, the initiator is organic soluble and is introduced in the organic phase prior to dispersion of the epoxy pre-polymer and ethylenically unsaturated monomer in water. In another embodiment, the initiator is water-soluble and is introduced after dispersion of the epoxy pre-polymer/ethylenically unsaturated monomer mixture in water. In another embodiment both organic soluble initiators and water-soluble initiators are added. In another embodiment an organic soluble initiator is introduced after the aqueous dispersion is formed. In this embodiment, the organic soluble initiator is added directly or dissolved in a co-solvent and dripped into the dispersion.

Non-exclusive examples of suitable organic soluble initiators include peroxides, peroxy esters as well as organic soluble azo compounds. Benzoyl peroxide is one preferred example. Non-exclusive examples of suitable water-soluble initiators include hydrogen peroxide, tert-butyl peroxide, t-butyl peroxtoate, hydroperoxides such as t-butyl hydroperoxide, alkali metal (sodium, potassium or lithium) or ammonium persulfate; azo initiators such as azobisisobutyronitrile or 2,2'-azobis(2-amidinopropane)dihydrochloride; or mixtures thereof. Ammonium persulfate and Vazo 68 WSP (Available from E.I. DuPont de Nemours) are two preferred examples. In one embodiment such initiators may also be combined with reducing agents to form a redox system. Non-exclusive examples of reducing agents include sulfites such as alkali metal meta bisulfite, or hyposulfite, sodium thiosulfate, or isoascorbic acid, or sodium formaldehyde sulfoxylate. The free radical precursor and reducing agent together, referred to as a redox system herein, may be used at a level of from about 0.01% to 5%, based on the weight of monomers used. Non-exclusive examples of redox systems include: t-butyl hydroperoxide/sodium formaldehyde sulfoxylate/Fe(III); t-butyl hydroperoxide/isoascorbic acid/Fe(III); and ammonium persulfate/sodium bisulfite/sodium hydrosulfite/Fe(III). In another embodiment, sodium formaldehyde sulfoxylate is used to initiate polymerization in conjunction with at least one anionic surfactant, such as sulfates and sulfonates in the absence of peroxides. Incorporation of anionic endgroups resulting from this method provides an increased level of stability for the emulsion as well as the corresponding autodeposition bath. Nonylphenol ethoxylate sulfate ammonium salt and sodium lauryl sulfate are two suitable non-exclusive examples.

In one embodiment, the polymerization of the ethylenically unsaturated monomer is carried out with applied heat. A wide variety of temperatures can be employed and the specific optimum temperature varies with each initiator. Generally, persulfates are processed at a temperature from about 75 to about 90° C. Process temperatures for peroxides and azo compounds are generally chosen such that the half-life decomposition rate falls from about 1 to about 120 minutes. Alternatively, redox initiation methods are widely known in the art by which polymerization can be conducted at ambient or near ambient conditions.

The dispersions and coating compositions of the present invention may also contain one or more substances capable of reacting with the polymer end product to provide a crosslinked polymeric matrix in the cured coating. In one embodiment of the invention, at least a portion of the curing agents (sometimes referred to as crosslinking agents) only react with the epoxy dispersion end-product at the elevated temperatures typically encountered during the curing stage of the composition. Such curing agents are often referred to in the art as "latent" curing agents or hardeners because they only become activated when heated to a temperature well in excess of normal room temperature. The use of latent curing agents is preferred in the present invention so that substantial cross linking of the epoxy resin or epoxy pre-polymer may be avoided prior to and during deposition on the surface of an article. In the case of metallic articles the deposition is typically carried out at temperatures of from about 20° C. to about 60° C. However, if so desired, minor amounts of more reactive curing agents may also be present in addition to the latent curing agents so as to accomplish partial crosslinking prior to deposition on an article. In one embodiment of the invention, at least one latent curing agent such as, for example, a blocked isocyanate is incorporated into the mixture before the at least one ethylenically unsaturated monomer is polymerized. Preferred blocked isocyanates comprise moderately reactive isocyanates such as aliphatic isocyanates and more sterically hindered and/or more acid stable blocking groups, such as those derived from the lactam of 6-aminohexanoic acid and/or benzotriazole. Typical stoving temperatures for such crosslinking agents are at or above 160° C. Utilization of such crosslinking agents avoids premature crosslinking from occurring during the polymerization process where temperatures are typically between ambient temperature and 100° C. Vestagon B1530 from Degussa Corporation is one representative example.

The preferred curing agents are generally selected so as to be capable of reacting with the hydroxyl groups and/or intact epoxide groups, which are present in the epoxy resin and/or ethylenically unsaturated monomer. Hydroxyl groups are inherent to epoxy resins as hydroxyl is formed upon ring opening of the epoxide, independent of whether this ring opening occurs in the advancement of the epoxy resin, or by reaction of residual epoxy with acids such as HF in the coating bath. Hydroxyl groups can also be imparted if hydroxyl functional ethylenically unsaturated monomer is used.

If a blocked isocyanate-type crosslinker is utilized, the ratio of blocked isocyanate groups to hydroxy groups (NCO:OH) typically will be from about 0.05 to about 1.2, more preferably about 0.1 to about 0.5. Other examples include blocked hexamethylene diisocyanates (HMDI).

Depending on the relative amounts of epoxy-prepolymer and ethylenically unsaturated monomer used, a solvent may also be used in conjunction with the ethylenically unsaturated monomer to form the crude or fine particle dispersions of the present invention. Solvent, for the purposes of the present application, includes any suitable solvent other than water. A solvent component may be used as a medium for preparing the epoxy pre-polymer. The solvent may be used when combining the epoxy resin and any catalysts capable of accelerating the desired epoxy group reaction. Subsequently, the solvent may be removed by techniques known in the art. The solvent, in many cases, does not diminish the technical benefits of the final coating composition and may be left in place when the dispersion is added as a component of the final coating composition. Any residual solvent will normally be expelled during the elevated temperatures found in the curing stage at the end of the coating process. The solvent component is not believed in most cases to contribute any desirable characteristics to the final coating compositions although it may function as a coalescing agent in some instances. However, in many cases the preferred solvents, however, are not particularly effective coalescing agents when used alone.

Any solvent capable of dissolving the epoxy resin can be selected. The most preferred solvents are mixtures of (i) aromatic hydrocarbons having 6 to 10 carbon atoms and (ii) ketones having 3 to 8 carbon atoms. A preferred solvent is methyl isobutyl ketone (MIBK).

Coalescing agents may be incorporated into the dispersion. Coalescing agents will be apparent to those skilled in the art. Non-exclusive examples of coalescing agents include monoethers and monoesters of glycols, preferably glycols with at least one terminal hydroxy group. Monoethers of ethylene glycol are readily available. Monoethers of propylene glycol, particularly the methyl, t-butyl, n-butyl, and phenol monoethers of propylene glycol, dipropylene glycol and tripropylene glycol are preferred from this class.

Dispersion of the epoxy pre-polymer and ethylenically unsaturated monomer in water can be accomplished by procedures known in the art. In one embodiment, the dispersion of the epoxy pre-polymer and ethylenically unsaturated monomer in water is accomplished by emulsification. Emulsification of the epoxy pre-polymer and ethylenically unsaturated monomer in water may be accomplished by any of the emulsification procedures known in the art. The desired result is a fine particle dispersion of epoxy pre-polymer and ethylenically unsaturated monomer containing micelles. Other desired coating components and additives may be emulsified with the epoxy pre-polymer and ethylenically unsaturated monomer.

In one embodiment, the emulsification procedure involves a two-stage process in which a solution of the epoxy pre-polymer, ethylenically unsaturated monomer, and any added components, is emulsified in water to form a crude dispersion of epoxy pre-polymer and ethylenically unsaturated monomer containing micelles. The crude dispersion is then mechanically dispersed to form a fine particle dispersion. In one embodiment, the crude dispersion is subjected to at least one particle size refinement stage. For example, the crude dispersion can be subjected to at least one particle size refinement stage in which the crude dispersion is forced through a narrow aperture to form the fine particle dispersion.

In one embodiment the epoxy pre-polymer, ethylenically unsaturated monomer, and any added components is microfluidized or homogenized in a microfluidizer or homogenizer having a chamber pressure of from about 6,000 psi to about 15,000 psi. As used herein, "microfluidized" and "homogenized" refer to a mechanical process for reducing the size of the droplets of the epoxy pre-polymer, ethylenically unsaturated monomer, and any added components. The epoxy pre-polymer, ethylenically unsaturated monomer, and any added components form droplets in the water. The average diameter of the droplets is from about 1 to 10 microns prior to microfluidization or homogenation. The average diameter of the epoxy pre-polymer, ethylenically unsaturated monomer, and any added components droplets is reduced to less than about 1 micron during microfluidization or homogenization. Preferably, the average diameter of the droplets is reduced to about 0.01 to about 0.5 microns during microfluidization or homogenation. During the microfluidization, the mixture containing the epoxy pre-polymer, ethylenically unsaturated monomer, any added components, and water is preferably passed through small channels under a pressure of from about 8,000 psi to about 12,000 psi at a speed of approximately 700 ft/sec. The interaction intensity, which involves shear, impingement, distention, and cavitation forces, on the mixture with the microfluidizer or homogenizer controls the size and distribution of the droplets in the mixture and ultimately the size of the polymer particles.

A preferred microfluidizer is available from Microfluidics Corporation. Preferred homogenizers are available from APV invensys. In the Microfluidics microfluidizer, a mixture is pumped into a specially designated chamber in which fluid sheets interact at ultrahigh velocities and pressures up to 1500 ft/second and 16,000 psi, respectively. The fixed microchannels within the chamber provide an extremely focused interaction zone of intense turbulence causing the release of energy amid cavitation and shear forces. Most preferably, the Microfluids microfluidizer is set at 8,000 to 12,000 psi chamber pressure.

In one embodiment, an emulsifying agent, such as a surfactant, is used to further or aid in the formation of the dispersion in water. Anionic surfactants are generally preferred, although amphoteric as well as nonionic surfactants may also be utilized. Combinations and mixtures of different surfactants may be employed. One class of preferred anionic surfactants for use in the present invention are ether sulfates that conform to general formula:

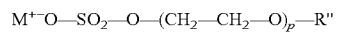

$$M^{+-}O-SO_2-O-(CH_2-CH_2-O)_p-R''$$

wherein:
M represents a monovalent cation or monovalent fraction of cation of higher valence, preferably, sodium or ammonium, more preferably ammonium;
p is a positive integer that preferably is between 2 and 7; and
R" represents an alkyl or alkylarl moiety, more preferably an alkyl phenol moiety. Independently, R" preferably has 8–30 and more preferably has 15–20 carbon atoms. Other suitable commercially available anionic emulsifiers include Dowfax™ 2A-1 (sodium salt of alkylated diphenyl oxide disulfonate); Abex™ 26-5; Texapon™ E-12 and K-12; Rhodapex™ CO-128, -433, and -436 and EP-100, -110, -115, -120, and -227; Disponsil™ AES-13, and Aerosol™ OT (sodium dioctylsulfosuccinate), and Polystep™ B40 from Stepan.

The single most preferred anionic emulsifying agent is Rhodapex™ CO-436, which is reported by its supplier Rhodia to be an ammonium salt of sulfonate nonylphenol ethoxylate and to contain 60% of this active ingredient. The preferred amount of active anionic emulsifying agent is from about 0.1 to about 5 wt % based on the weight of the total composition of solids and is preferably from about 0.7 to about 2 wt %. In one embodiment a polymerizable anionic surfactant is used to further or aid in the formation of the dispersion in water. Polymerizable anionic surfactants are widely known in the industry. Requirements for polymerizable anionic surfactants used in the present invention are that they possess anionic surfactant structure in addition to a group capable of participating in radical polymerization. Utilization binds the surfactant to the polymer in the dispersion, which improves stability and reduces levels of free surfactant required. Non-exclusive examples of polymerizable anionic surfactants include sodium allyloxy hydroxypropyl sulfonate, and propenyl modified nonylphenol ethoxylate sulfate salts such as Hitenol A-10, Hitenol BC-10 and Hitenol BC-05 (products of DKS International, Inc.). Hitenol BC-10 and Hitenol BC-05 are particularly preferred.

A dispersion or coating bath composition of the present invention may also contain a number of additional ingredients that are added before, during, or after the formation of the dispersion. Such additional ingredients include fillers, biocides, foam control agents, pigments and soluble colorants, and flow control or leveling agents. The compositions of these various components maybe selected in accordance with the concentrations of corresponding components used in conventional epoxy resin-based autodeposition compositions, such as those described in U.S. Pat. Nos. 5,500,460, and 6,096,806 and U.S. Ser. No. 09/578,935, the teachings of which are hereby incorporated by reference.

Suitable flow control additives or leveling agents include, for example, the acrylic (polyacrylate) substances known in the coatings art such as the products sold under the trademark MODAFLOW® by Solutia, as well as other leveling agents such as BYK-310 (from BYK-Chemie), PERENOL® F-60 (from Henkel), and FLUORAD® FC-430 (from 3M).

Pigments and soluble colorants may generally be selected for compositions according to this invention from materials established as satisfactory for similar uses. Examples of suitable materials include carbon black, phthalocyanine blue, phthalocyanine green, quinacridone red, hansa yellow, and/or benzidine yellow pigment, and the like.

To prepare a coating bath composition suitable for coating a metallic substrate by autodeposition, the high solids, epoxy dispersion is combined with at least one autodeposition accelerator component, which is capable of causing the dissolution of active metals (e.g., iron) from the surface of the metallic substrate in contact with the bath composition. Preferably, the amount of accelerator present is sufficient to dissolve at least about 0.020 gram equivalent weight of metal ions per hour per square decimeter of contacted surface at a temperature of 20° C. Preferably, the accelerator(s) are utilized in a concentration effective to impart to the bath composition an oxidation-reduction potential that is at least 100 millivolts more oxidizing than a standard hydrogen electrode. Such accelerators are well-known in the autodeposition coating field and include, for example, substances such as an acid, oxidizing agent, and/or complexing agent capable of causing the dissolution of active metals from active metal surfaces in contact with an autodeposition composition. The autodeposition accelerator component may be chosen from the group consisting of hydrofluoric acid and its salts, fluosilicic acid and its salts, fluotitanic acid and its salts, ferric ions, acetic acid, phosphoric acid, sulfuric acid, nitric acid, hydrogen peroxide, peroxy acids, citric acid and its salts, and tartaric acid and its salts. More preferably, the accelerator comprises: (a) a total amount of fluoride ions of at least 0.4 g/L, (b) an amount of dissolved trivalent iron atoms that is at least 0.003 g/L, (c) a source of hydrogen ions in an amount sufficient to impart to the autodeposition composition a pH that is at least 1.6 and not more than about 5, and, optionally, (d) hydrogen peroxide. Hydrofluoric acid is preferred as a source for both the fluoride ions as well as the proper pH. Ferric fluoride can supply both fluoride ions as well as dissolved trivalent iron. Accelerators comprised of HF and $FeF_3$ are especially preferred for use in the present invention.

In one embodiment, ferric cations, hydrofluoric acid, and hydrogen peroxide are all used to constitute the autodeposition accelerator component. In a working composition according to the invention, independently for each constituent: the concentration of ferric cations preferably is at least, with increasing preference in the order given, 0.5, 0.8 or 1.0 g/l and independently preferably is not more than, with increasing preference in the order given, 2.95, 2.90, 2.85, or 2.75 g/l; the concentration of fluorine in anions preferably is at least, with increasing preference in the order given, 0.5, 0.8, 1.0, 1.2, 1.4, 1.5, 1.55, or 1.60 g/l and independently is not more than, with increasing preference in the order given, 10, 7, 5, 4, or 3 g/l; and the amount of hydrogen peroxide added to the freshly prepared working composition is at least, with increasing preference in the order given, 0.05, 0.1, 0.2, 0.3, or 0.4 g/l and independently preferably is not more than, with increasing preference in the order given, 2.1, 1.8, 1.5, 1.2, 1.0, 0.9, or 0.8 g/l.

The dispersions and coating compositions of the present invention can be applied in the conventional manner. For example, with respect to an autodeposition composition, ordinarily a metal surface is degreased and rinsed with water before applying the autodeposition composition. Conventional techniques for cleaning and degreasing the metal surface to be treated according to the invention can be used for the present invention. The rinsing with water can be performed by exposure to running water, but will ordinarily be performed by immersion for about 10 to about 120 seconds, or preferably from about 20 to about 60 seconds, in water at ordinary ambient temperature.

Any method can be used for contacting a metal surface with the autodeposition composition of the present invention. Examples include immersion (e.g., dipping), spraying or roll coating, and the like. Immersion is usually preferred.

In one embodiment, the coating process according to this invention comprises the steps of contacting an object with an active metal surface with the coating bath composition for a sufficient time to cause the formation of a film of the polymer of a predetermined thickness on the metal surface, separating the coated metal surface from contact with the autodeposition bath composition, rinsing the coated metal surface to remove at least some of the absorbed but otherwise unadhered components of the bath composition from the more adherent portion of the coating and heating the rinsed surface to form a final film.

In one embodiment, contact between an active metal surface and the autodeposition bath compositions of this invention is for a time from about 0.5 to about 10 minutes or in another embodiment for a time from about 1 to about 3 minutes. Contact preferably is long enough to produce a final film thickness in one embodiment of from about 10 to about 50 microns and in another embodiment from about 18 to about 25 microns.

Optionally, a reagent capable of causing additional desirable reactions in or modifications of the coated film may be included in the rinse used after cessation of contact between the wet coated surface and the bulk of the autodeposition bath composition. Such a reagent may also be brought into contact with the wet coated film after rinsing with water alone. Although the autodeposition bath compositions of the invention generally produce wet coated films that can be heated after simple rinsing with tap or deionized water to give good quality final films, the corrosion resistance of the cured coating may be further improved by rinsing with an aqueous solution comprising an alkaline earth metal compound such as calcium nitrate as described in co-pending application Ser. No. 09/578,935, filed May 25, 2000, and Ser. No. 09/990,066, filed Nov. 21, 2001, both of which are incorporated herein by reference in their entirety.

Compositions employed in the present invention can be used in, for example, autodeposition compositions, for treating surfaces of iron, zinc, iron alloy and zinc alloy, and particularly steel portions of various components such as automobile sheet components and automobile components such as shock absorbers, jacks, leaf springs, suspension components and brackets, and the like, and components of furniture such as drawer rails, and the like. Autodeposition coatings are particularly well suited for indoor metal furniture that is subjected to wear and surface impacts, e.g., filing cabinets, filing shelves, desks, etc.

EXAMPLE 1

Preparation of an Autodepositing Epoxy-Acrylic Dispersion

To a clean, 2-liter, 4-necked flask, equipped with agitator, nitrogen inlet, condenser and addition funnel was added 149.4 grams of D.E.R.® 331—bisphenol A diglycidyl ether (a product of Dow Chemical), 56.9 grams of bisphenol A, and 36.4 grams of nonylphenol. In a beaker, 10.0 grams of methyl isobutyl ketone (MIBK) and 0.3 grams of triphenylphosphine, were mixed to a homogeneous solution. The methyl isobutyl ketone (MIBK)—triphenylphosphine solution from the beaker was added to the flask after the contents of the flask had been heated to 120° C. under a nitrogen blanket. The resulting mixture exothermed to a temperature of 154° C., after which a temperature of 150° C. was maintained for a period of 3 hours.

The reaction product in the flask was cooled to 100° C., at which time 47.4 grams of Vestagon® B1530—blocked isocyanate crosslinker (a product of Huels, now Degussa)—were added to the flask. After 15 minutes of mixing, the Vestagon® B1530 was fully melted.

The reaction product in the flask was then cooled to 93° C., at which time a homogeneous mixture of 113.7 grams of styrene, 113.7 grams n-butyl acrylate, 15.6 grams of methacrylic acid, 23.2 grams of Texanol®—coalescing solvent (a product of Eastman Chemical Company), and 12.2 grams of benzoyl peroxide, was added to the flask and mixed.

The reaction product in the flask was then cooled to 63° C., at which time a homogeneous mixture of 13.3 grams of Rhodapex® CO-436 surfactant (a product of Rhodia) and 707.9 grams of deionized water was added to the flask over a period of 10 minutes with mixing.

The crude dispersion was removed from the flask and passed three times through a M-110F Microfluidizer® (a product of Microfluidics Corporation) at 9,000 psi to form a fine particle dispersion. After returning the fine particle dispersion to the flask, the fine particle dispersion was heated to and maintained at a temperature of about 91° C. for 2 hours. The fine particle dispersion was then cooled.

EXAMPLE 2

Preparation of an Autodepositing Coating Bath Using the Epoxy-Acrylic Dispersion of Example 1

To a 1 liter polyethylene wide mouth jar, 8.28 grams of Aquablak® 255A—carbon black dispersion (a product of Borden, now Solution Dispersion Inc.) was added into 250 grams of the fine particle dispersion of Example 1. The jar was placed on an Eberbach Shaker Table for at least 30 minutes to mix thoroughly. The result was a homogeneous pigmented fine particle dispersion.

221.7 grams of the pigmented fine particle dispersion was then added to a clean 1.5 liter plastic container. Next, 800 grams of deionized water was added to the container and the contents were mixed for approximately two minutes. 75 grams of AUTOPHORETIC® 300 Starter (a product containing autodeposition accelerators and other components available from the Surface Technologies Division of Henkel Corporation) was added and the container contents mixed thoroughly to form an autodepositing coating bath. Next, 403.3 grams of deionized water was added to bring the bath to a volume of 1.5 liters. The bath was allowed to equilibrate for 24 hours prior to coating parts.

EXAMPLE 3

Preparation of an Autodepositing Epoxy-Acrylic Dispersion

To a clean, 2-liter, 4-necked flask, equipped with agitator, nitrogen inlet, condenser and addition funnel was added 236.5 grams of D.E. R® 331—bisphenol A diglycidyl ether (a product of Dow Chemical) and 103.4 grams of bisphenol A. In a beaker, 29.6 grams of methyl isobutyl ketone (MIBK) and 0.4 grams of triphenylphosphine, were mixed to a homogeneous solution. The methyl isobutyl ketone (MIBK)—triphenylphosphine solution from the beaker was added to the flask after the contents of the flask had been heated to 120° C. under a nitrogen blanket. The resulting mixture exothermed to a temperature of 153° C., after which a temperature of 150° C. was maintained for a period of 2 hours.

During the 2 hour period, several homogeneous mixtures were prepared, each in a separate container. In a first container was prepared a homogeneous mixture of 100 grams of methyl isobutyl ketone (MIBK), 11.5 grams Modaflow® 2100—leveling agent (a product of Solutia, Inc.) and 11.5 grams of Texanol®—coalescing solvent (a product of Eastman Chemical Company). In a second container was prepared a homogeneous mixture of 86.4 grams of Vestagon® B1530—blocked isocyanate crosslinker (a product of Huels, now Degussa), 100 grams of methyl isobutyl ketone (MIBK), and 68.2 grams of styrene. In a third container was prepared a homogeneous mixture of 49.5 grams of n-butyl acrylate, 28.1 grams of 2-hydroxyethyl methacrylate, and 7.3 grams of benzoyl peroxide.

After the two-hour period expired, the reaction product in the flask was cooled to 102° C., at which time the contents of the first and second containers were added to the flask. This cooled the flask mixture to 60° C. The contents of the third container were then added to the flask with mixing.

A homogeneous mixture of 14.1 grams Rhodapex® CO-436 surfactant (a product of Rhodia) and 762.0 grams of deionized water was added to the flask over a period of 10 minutes with mixing.

The resulting crude dispersion was removed from the flask and passed three times through a M-110F Microfluidizer® unit (a product of Microfluidics Corporation) at 9,500 psi to form a fine particle dispersion. After returning the fine particle dispersion to the flask, the fine particle dispersion was heated to and maintained at a temperature of 88° C. for a period of 3 hours. The MIBK was then removed by azeotropic distillation. A total of 343 grams of distillate (MIBK and water) were collected and replaced with 246.0 g of deionized water. The fine particle dispersion was then cooled.

EXAMPLE 4

Preparation of an Autodepositing Coating Bath Using the Epoxy-Acrylic Dispersion of Example 3

To a 1 liter polyethylene wide mouth jar, 24.1 grams of Aquablak® 255A—carbon black dispersion (a product of Borden, now Solution Dispersion Inc.) was added into 801.3 grams of the fine particle dispersion of Example 3. The jar was placed on an Eberbach Shaker Table for at least 30 minutes to mix thoroughly. The result was a homogeneous pigmented fine particle dispersion.

266.4 grams of the pigmented fine particle dispersion was then added to a clean 1.5 liter plastic container. Next, 800 grams of deionized water was added to the container and the contents were mixed for approximately two minutes. 75 grams of AUTOPHORETIC® 300 Starter (a product containing autodeposition accelerators and other components available from the Surface Technologies Division of Henkel Corporation) was added and the container contents mixed thoroughly to form an autodepositing coating bath. Next, 358.6 grams of deionized water was added to bring the bath to a volume of 1.5 liters. The bath was allowed to equilibrate for 24 hours prior to coating parts.

EXAMPLE 5

Preparation of an Epoxy Prepolymer 1042.7 grams of D.E.R.® 331—bisphenol A diglycidyl ether (a product of Dow Chemical) and 455.6 grams of bisphenol A were added to a 5 L flask equipped with agitator, condenser and nitrogen inlet. 1.7 grams of triphenyl phosphine was mixed in 125.8 grams of toluene until dissolved and was then added to the 5 L flask. The contents of the flask was heated and maintained at 150° C. for a period of 2.5 hours under nitrogen atmosphere. After cooling the contents of the flask was reduced with 861.5 grams of toluene. The resulting epoxy prepolymer had a titrated epoxy equivalent weight of 1008 g/eq. on solids.

EXAMPLE 6

Preparation of an Autodepositing Epoxy-Acrylic Dispersion 268.0 grams of the epoxy prepolymer of Example 5, 7.6 grams of Modaflow® 2100—leveling agent (a product of Solutia, Inc.), and 22.8 grams of Texanol®—coalescing solvent (a product of Eastman Chemical Company) were charged to a 2 L flask equipped with agitator, condenser and nitrogen inlet and heated to 75C.

A homogeneous mixture of 40.7 grams of styrene, 37.4 grams n-butyl acrylate, 84.7 grams of methyl methacrylate, and 57.0 grams of Vestagon® B1530—blocked isocyanate crosslinker (a product of Degussa) was added to the 2 L flask and mixed.

554.0 grams of deionized water and 9.4 grams of Rhodapex® CO-436 surfactant (a product of Rhodia) were charged to a plastic beaker and mixed. The resulting mixture was then was added to the 2 L flask at a uniform rate over a period of 10 minutes to form a crude dispersion.

The crude dispersion was then passed two times through a M-110F Microfluidizer® (a product of Microfluidics Corporation) at 9,500 psi to form a fine particle dispersion. Average particle size was measured to be 220 nm.

The fine particle dispersion was loaded to a 2 L flask under nitrogen atmosphere equipped with agitator, condenser and nitrogen inlet, and addition funnels. A mixture of 0.23 grams of 1% ferrous sulfate, 0.11 grams of sodium formaldehyde sulfoxylate, and 3.3 grams of deionized water was then added to the flask with mixing and then the contents of the flask were heated to 55° C. and maintained at 55° C. for 30 minutes.

A mixture of 1.12 grams of sodium formaldehyde sulfoxylate and 32.4 grams of deionized water was then added to the flask at a uniform rate over a period of three hours. Midway through the addition period, was begun the addition of a mixture of 1.68 grams of t-butyl hydroperoxide and 32.4 grams of deionized water, which was added at a uniform rate over a period of 3 hours. During these additions, the contents of the flask were then heated to 75° C.

Once addition was complete, the flask contents were heated to and maintained at 78° C. for a period of one hour. 0.2 grams of Agitan 305 foam control agent (a product of King Industries) was then added and contents of the flask were distilled until free of toluene. The final measured solids were 40.9%.

EXAMPLE 7

Preparation of an Autodepositing Coating Bath Using the Epoxy-Acrylic Dispersion of Example 6

To a 1 liter polyethylene wide mouth jar, 26.05 grams of Aquablak® 255A—carbon black dispersion (a product of Borden, now Solution Dispersion Inc.) was added into 803.4 grams of the fine particle dispersion of Example 6. The jar was placed on an Eberbach Shaker Table for at least 30 minutes to mix thoroughly. The result was a homogeneous pigmented fine particle dispersion.

225.7 grams of the pigmented fine particle dispersion was then added to a clean 1.5 liter plastic container. Next, 927.1 grams of deionized water was added to the container and the contents were mixed for approximately two minutes. 75 grams of AUTOPHORETIC® 300 Starter (a product containing autodeposition accelerators and other components available from the Surface Technologies Division of Henkel Corporation) was added and the container contents mixed thoroughly to form an autodepositing coating bath. Next, 272.1 grams of deionized water was added to bring the bath to a volume of 1.5 liters. The bath was allowed to equilibrate for 24 hours prior to coating parts.

EXAMPLE 8

Preparation of an Epoxy Prepolymer 1593.0 grams of D.E. R® 331—bisphenol A diglycidyl ether (a product of Dow Chemical) and 696.1 grams of bisphenol A, and 100.0 g methyl isobutyl ketone were added to a 5 L flask equipped with agitator, condenser and nitrogen inlet. 2.6 grams of triphenyl phosphine was mixed in 92.1 grams of methyl isobutyl ketone until dissolved and was then added to the 5 L flask. The contents of the flask was heated and maintained at 150° C. for a period of 2.0 hours under nitrogen atmosphere. After cooling the contents of the flask was reduced with 886.1 grams of methyl isobutyl ketone. The resulting epoxy prepolymer had a titrated epoxy equivalent weight of 992 g/eq. on solids.

EXAMPLE 9

Preparation of an Epoxy Acrylic Dispersion 237.0 grams of the epoxy prepolymer of Example 8, 57.0 grams of Vestagon® B1530—blocked isocyanate crosslinker (a product of Huels, now Degussa), 19.1 grams of Texanol®—coalescing solvent (a product of Eastman Chemical Company), and 11.8 grams of methyl isobutyl ketone were charged to a 2 L flask equipped with agitator, condenser and nitrogen inlet and heated and maintained at 75° C. for one hour.

The contents of the 2 L flask was cooled to 70° C. and then a homogeneous mixture of 52.9 grams of styrene, 50.3 grams n-butyl acrylate, 52.9 grams of methyl methacrylate, 4.1 grams of 2-hydroxymethyl methacrylate, and 2.6 grams of methacrylic acid was added, from a separate container, and the contents mixed for 10 minutes.

554.0 grams of deionized water and 9.4 grams of Rhodapex® CO-436 surfactant (a product of Rhodia) were charged to a plastic beaker and mixed. The resulting mixture was then was added to the 2 L flask at a uniform rate over a period of 15 minutes to form a crude dispersion.

The crude dispersion was then passed two times through a M-110F Microfluidizer® (a product of Microfluidics Corporation) at 9,000 psi to form a fine particle dispersion. Average particle size was measured to be 240 nm.

The fine particle dispersion was loaded to a 2 L flask under nitrogen atmosphere equipped with agitator, condenser and nitrogen inlet, and addition funnels. A mixture of 0.23 grams of 1% ferrous sulfate, 0.11 grams of sodium formaldehyde sulfoxylate, and 3.2 grams of deionized water was then added to the flask with mixing and then the contents of the flask were heated to 55° C. and maintained at 55° C. for 30 minutes.

A mixture of 1.12 grams of sodium formaldehyde sulfoxylate and 32.4 grams of deionized water was then added to the flask at a uniform rate over a period of three hours. Midway through the addition period, was begun the addition of a mixture of 1.70 grams of t-butyl hydroperoxide and 32.4 grams of deionized water, which was added at a uniform rate over a period of 3 hours. During these additions, the contents of the flask were then heated to 75° C.

Once addition was complete, the flask contents were heated to and maintained at 78° C. for a period of one hour. 0.2 grams of Agitan 305 foam control agent (a product of King Industries) was then added and contents of the flask were distilled until free of methyl isobutyl ketone. The final measured solids were 47.5%.

EXAMPLE 10

Preparation of an Autodepositing Coating Bath Using the Epoxy-Acrylic Dispersion of Example 9

To a 1 liter polyethylene wide mouth jar, 27.3 grams of Aquablak® 255A—carbon black dispersion (a product of Borden, now Solution Dispersion Inc.) was added into 756.9 grams of the fine particle dispersion of Example 9. The jar was placed on an Eberbach Shaker Table for at least 30 minutes to mix thoroughly. The result was a homogeneous pigmented fine particle dispersion.

409.5 grams of deionized water was added to a clean 1.5 liter plastic container. Next, 75.2 grams of AUTOPHORETIC® 300 Starter (a product containing autodeposition accelerators and other components available from the Surface and Technologies Division of Henkel Corporation) was added and the contents mixed for one minute. 196.7 grams of the pigmented fine particle dispersion was then added followed by 818.9 grams of deionized water to bring the bath to a volume of 1.5 liters. The container contents were mixed thoroughly for two minutes. The bath was allowed to equilibrate for 24 hours prior to coating parts.

EXAMPLE 11

Preparation of an Epoxy Prepolymer 1844.7 grams of D.E.R.® 331—bisphenol A diglycidyl ether (a product of Dow Chemical), 702.8 grams of bisphenol A, and 449.6 grams of nonylphenol were added to a 5 L flask equipped with agitator, condenser and nitrogen inlet. 3.0 grams of triphenyl phosphine was mixed in 279.9 grams of methyl isobutyl ketone until dissolved and was then added to the 5 L flask. The contents of the flask was heated and maintained at 150° C. for a period of 3 hours under nitrogen atmosphere. After cooling the contents of the flask was reduced with 249.5 grams of methyl isobutyl ketone and 141.1 grams of Texanol®—coalescing solvent (a product of Eastman Chemical Company). The resulting epoxy prepolymer had a titrated epoxy equivalent weight of 1754 g/eq. on solids.

EXAMPLE 12

Preparation of an Autodepositing Dispersion Containing a Phosphate Ester Monomer 197.7 grams of the epoxy prepolymer of Example 11, 7.6 grams of Modaflow® 2100—leveling agent (a product of Solutia, Inc.), and 70.1 grams of methyl isobutyl ketone were charged to a 2 L flask equipped with agitator, condenser and nitrogen inlet and heated to 75 C. A homogeneous mixture of 68.1 grams of styrene, 68.0 grams n-butyl acrylate, 16.3 grams of 2-hydroxyethyl methacrylate,. 5.2 grams of methacrylic acid, and 57.0 grams of Vestagon® B1530—blocked isocyanate crosslinker (a product of Huels, now Degussa) was prepared and then added to the 2 L flask and mixed for 10 minutes 554.0 grams of deionized water and 9.4 grams of Rhodapex® CO-436 surfactant (a product of Rhodia) were charged to a plastic beaker and mixed. The resulting mixture was then was added to the 2 L flask at a uniform rate over a period of 10 minutes to form a crude dispersion.

The crude dispersion was then passed two times through a M-110F Microfluidizer® (a product of Microfluidics Corporation) at 9,500 psi to form a fine particle dispersion. Average particle size was measured to be 212 nm.

The fine particle dispersion was loaded to a 2 L flask under nitrogen atmosphere equipped with agitator, condenser and nitrogen inlet, and addition funnels. A mixture of 0.23 grams of 1% ferrous sulfate, 0.11 grams of sodium formaldehyde sulfoxylate, and 3.3 grams of deionized water was then added to the flask with mixing and then the contents of the flask were heated to 55° C. and maintained at 55° C. for 30 minutes.

A mixture of 5.2 grams of PAM 200 phosphate ester monomers available from Rhodia, 20.0 grams of deionized water, and 1.6 grams of ammonium hydroxide (29.3% $NH_3$) was then add to the flask.

A mixture of 1.12 grams of sodium formaldehyde sulfoxylate and 32.4 grams of deionized water was then added to the flask at a uniform rate over a period of three hours. Midway through the addition period, was begun the addition of a mixture of 1.12 grams of t-butyl hydroperoxide and 32.4 grams of deionized water, which was added at a uniform rate over a period of 3 hours. During these additions, the contents of the flask were then heated to 75° C. Once addition was complete, the flask contents were heated to and maintained at 75° C. for a period of one hour. 0.2 grams of Agitan 305 foam control agent (a product of King Industries) was then added and contents of the flask were distilled until free of methyl isobutyl ketone. The final measured solids were 39.7%.

EXAMPLE 13

Preparation of an Autodepositing Dispersion Without a Phosphate Ester Monomers (Comparative Example to Example 12)

197.7 grams of the epoxy prepolymer of Example 11, 7.6 grams of Modaflow® 2100—leveling agent (a product of Solutia, Inc.), and 70.1 grams of methyl isobutyl ketone were charged to a 2 L flask equipped with agitator, condenser and nitrogen inlet and heated to 75 C. A homogeneous mixture of 68.1 grams of styrene, 68.0 grams n-butyl acrylate, 16.3 grams of 2-hydroxyethyl methacrylate,. 5.2 grams of methacrylic acid, and 57.0 grams of Vestagon® B1530—blocked isocyanate crosslinker (a product of Huels, now Degussa) was prepared and then added to the 2 L flask and mixed for 10 minutes 554.0 grams of deionized water and 9.4 grams of Rhodapex® CO-436 surfactant (a product of Rhodia) were charged to a plastic beaker and mixed. The resulting mixture was then was added to the 2 L flask at a uniform rate over a period of 10 minutes to form a crude dispersion.

The crude dispersion was then passed two times through a M-110F Microfluidizer® (a product of Microfluidics Corporation) at 9,500 psi to form a fine particle dispersion. Average particle size was measured to be 223 nm.

The fine particle dispersion was loaded to a 2 L flask under nitrogen atmosphere equipped with agitator, condenser and nitrogen inlet, and addition funnels. A mixture of 0.23 grams of 1% ferrous sulfate, 0.11 grams of sodium formaldehyde sulfoxylate, and 3.3 grams of deionized water was then added to the flask with mixing and then the contents of the flask were heated to 55° C. and maintained at 55° C. for 30 minutes.

A mixture of 1.12 grams of sodium formaldehyde sulfoxylate and 32.4 grams of deionized water was then added to the flask at a uniform rate over a period of three hours. Midway through the addition period, was begun the addition of a mixture of 1.12 grams of t-butyl hydroperoxide and 32.4 grams of deionized water, which was added at a uniform rate over a period of 3 hours. During these additions, the contents of the flask were then heated to 75° C.

Once addition was complete, the flask contents were heated to and maintained at 75° C. for a period of one hour. 0.2 grams of Agitan 305 foam control agent (a product of King Industries) was then added and contents of the flask were distilled until free of methyl isobutyl ketone. The final measured solids were 42.6%.

EXAMPLE 14

Preparation of Coating Bath Using Example 12

To a 1 liter polyethylene wide mouth jar, 26.25 grams of Aquablak® 255A—carbon black dispersion (a product of Borden, now Solution Dispersion Inc.) was added into 756.38 grams of the fine particle dispersion of Example 12. The jar was placed on an Eberbach Shaker Table for at least 60 minutes to mix thoroughly. The result was a homogeneous pigmented fine particle dispersion.

226.5 grams of the pigmented fine particle dispersion were then added to a clean 1.5 liter plastic container. Next, 674.5 grams of deionized water was added to the container and the contents were mixed for approximately two minutes. 75 grams of AUTOPHORETIC® 300 Starter (a product containing autodeposition accelerators and other components available from the Surface Technologies Division of Henkel Corporation) was added and the container contents mixed thoroughly to form an autodepositing coating bath. Next, 524.0 grams of deionized water was added to bring the bath to a volume of 1.5 liters. The bath was allowed to equilibrate for 24 hours prior to coating parts.

EXAMPLE 15

Preparation of Coating Bath Using Example 13

To a 1 liter polyethylene wide mouth jar, 25.83 grams of Aquablak® 255A—carbon black dispersion (a product of Borden, now Solution Dispersion Inc.) was added into 764.22 grams of the fine particle dispersion of Example 13. The jar was placed on an Eberbach Shaker Table for at least 60 minutes to mix thoroughly. The result was a homogeneous pigmented fine particle dispersion.

403.8 grams of deionized water and 75 grams of AUTOPHORETIC® 300 Starter (a product containing autodeposition accelerators and other components available from the Surface Technologies Division of Henkel Corporation) were then added to a clean 1.5 liter plastic container and mixed for one minute.

Next, 213.5 grams of the pigmented fine particle dispersion of Example 13 was added to the container and the contents were mixed thoroughly. Next, 807.7 grams of deionized water was added to bring the bath to a volume of 1.5 liters. The bath was allowed to equilibrate for 24 hours prior to coating parts.

EXAMPLE 16

Processing Panels through the Autodepositing Coating Bath of Example 2

Operation and Control Conditions for the Coating Bath:
The redox value of the autodepositing coating bath of example 2 was maintained in the range of 300 mv to 450 mv by addition of hydrogen peroxide. Free fluoride ion level was monitored by a Lineguard® 101 meter (available from Henkel Surface Technologies) and maintained in the range of 125 to 200 microamperes by addition of aqueous hydrofluoric acid. Bath solids were monitored by a Mettler® HR73 Moisture Analyzer and maintained in the range of 5.5% to 6.5% by addition of additional pigment fine particle dispersion obtained from Example 2.

Coating Sequence:

A 4"×5" ACT cold rolled steel panel was immersed for 120 seconds in Autophoretic®ACL 2592 cleaner at 80° C., followed by a 60-second tap rinse and 60-second deionized water rinse. The panels were immersed in the autodepositing coating bath of example 2 for 90-seconds under ambient conditions followed by a 30-second dwell (i.e. the panel is raised out of the bath and allowed to drip for 30 seconds in air). The panel was then immersed in tap water for 60 seconds, to wash away undeposited coating bath, and was then immersed for 60-seconds in E3 Autophoretic® reaction rinse at 50° C.±2° C. (E3 Autophoretic reaction rinse is available from the Surface Technologies Division of Henkel Corporation). The panels were flashed in an oven for 5-minutes at 53° C. and then cured at 185° C. for 40 minutes.

Film Characteristics:

| | |
|---|---|
| Film Build | 0.7–1.0 mil |
| Tape Adhesion (ASTM D3359, method B) | 5 B |
| 504 hour NSS (ASTM B117) | 5.9 mm in total creep |
| 30 cycles SAE J2334 | 1.7 mm in total creep |
| 30 cycles GM 9540P | 3.1 mm in total creep |

EXAMPLE 17

Processing Panels through the Autodepositing Coating Bath of Example 4

Operation and Control Conditions for the Coating Bath:

The redox value of the autodepositing coating bath of example 4 was maintained in the range of 300 mv to 450 mv by addition of hydrogen peroxide. Free fluoride ion level was monitored by a Lineguard® 101 meter (available from Henkel Surface Technologies) and maintained in the range of 125 to 200 microamperes by addition of aqueous hydrofluoric acid. Bath solids were monitored by a Mettler® HR73 Moisture Analyzer and maintained in the range of 5.5% to 6.5% by addition of additional pigment fine particle dispersion obtained from Example 4.

Coating Sequence:

A 4"×5" ACT cold rolled steel panel was immersed for 120 seconds in Autophoretic®ACL 2592 cleaner at 80° C., followed by a 60-second tap rinse and 60-second deionized water rinse. The panels were immersed in the autodepositing coating bath of example 4 for 90-seconds under ambient conditions followed by a 30-second dwell (i.e. the panel is raised out of the bath and allowed to drip for 30 seconds in air). The panel was then immersed in tap water for 60 seconds, to wash away undeposited coating bath, and was then immersed for 60-seconds in E3 Autophoretic® reaction rinse at 50° C.±2° C. (E3 Autophoretic reaction rinse is available from the Surface Technologies Division of Henkel Corporation). The panels were flashed in an oven for 5-minutes at 53° C. and then cured at 185° C. for 40 minutes.

Film Characteristics:

| | |
|---|---|
| Film Build | 0.7–1.0 mil |
| Tape Adhesion (ASTM D3359, method B) | 5 B |
| 504 hour NSS (ASTM B117) | 3.1 mm in total creep |
| 30 cycles SAE J2334 | 3.1 mm in total creep |
| 30 cycles GM 9540P | 2.4 mm in total creep |

EXAMPLE 18

Processing Panels through the Autodepositing Coating Bath of Example 7

Operation and Control Conditions for the Coating Bath:

The redox value of the autodepositing coating bath of Example 7 was maintained in the range of 300 mv to 450 mv by addition of hydrogen peroxide. Free fluoride ion level was monitored by a Lineguard® 101 meter (available from Henkel Surface Technologies) and maintained in the range of 175 to 220 microamperes by addition of aqueous hydrofluoric acid. Bath solids were monitored by a Mettler® HR73 Moisture Analyzer and maintained in the range of 5.5% to 6.5% by addition of additional pigment fine particle dispersion obtained from Example 7.

Coating Sequence:

A 4"×5" ACT cold rolled steel panel was immersed for 120 seconds in Autophoretic®ACL 2592 cleaner at 80° C., followed by a 60-second tap rinse and 60-second deionized water rinse. The panels were immersed in the autodepositing coating bath of example 9 for 90-seconds under ambient conditions followed by a 30-second dwell (i.e. the panel is raised out of the bath and allowed to drip for 30 seconds in air). The panel was then immersed for 60-seconds in E3 Autophoretic® reaction rinse at 50° C.±2° C. (E3 Autophoretic reaction rinse is available from the Surface Technologies Division of Henkel Corporation). The panels were flashed in an oven for 5-minutes at 53° C. and then cured at 185° C. for 40 minutes.

Film Characteristics:

| | |
|---|---|
| Film Build | 0.7–1.2 mil |
| Tape Adhesion (ASTM D3359, method B) | 5 B |
| 504 hour NSS (ASTM B117) | 2.6 mm in total creep |
| 30 cycles SAE J2334 | 3.1 mm in total creep |
| 30 cycles GM 9540P | 1.4 mm in total creep |

EXAMPLE 19

Processing Panels through the Autodepositing Coating Bath of Example 10

Operation and Control Conditions for the Coating Bath:

The redox value of the autodepositing coating bath of Example 10 was maintained in the range of 300 mv to 450 mv by addition of hydrogen peroxide. Free fluoride ion level was monitored by a Lineguard® 101 meter (available from Henkel Surface Technologies) and maintained in the range of 175 to 220 microamperes by addition of aqueous hydrofluoric acid. Bath solids were monitored by a Mettler® HR73 Moisture Analyzer and maintained in the range of 5.5% to 6.5% by addition of additional pigment fine particle dispersion obtained from Example 10.

Coating Sequence:

A 4"×5" ACT cold rolled steel panel was immersed for 120 seconds in Autophoretic®ACL 2592 cleaner at 80° C., followed by a 60-second tap rinse and 60-second deionized water rinse. The panels were immersed in the autodepositing coating bath of example 13 for 90-seconds under ambient conditions followed by a 30-second dwell (i.e. the panel is raised out of the bath and allowed to drip for 30 seconds in air). The panel was then immersed for 60-seconds in E3 Autophoretic® reaction rinse at 50° C.±2° C. (E3 Autophoretic reaction rinse is available from the Surface Technologies Division of Henkel Corporation). The panels were flashed in an oven for 5-minutes at 53° C. and then cured at 185° C. for 40 minutes.

Film Characteristics:

| | |
|---|---|
| Film Build | 0.8–1.1 mil |
| Tap Adhesion (ASTM D3359, method B) | 5 B |
| 240 hour Water Immersion (ASTM D870) | 5 B/10 |
| 504 hour NSS (ASTM B117) | 2.6 mm in total creep |

EXAMPLE 20

Processing Panels through the Autodepositing Coating Bath of Example 14

Operation and Control Conditions for the Coating Bath:

The redox value of the autodepositing coating bath of example 14 was maintained in the range of 300 mv to 450 mv by addition of hydrogen peroxide. Free fluoride ion level was monitored by a Lineguard® 101 meter (available from Henkel Surface Technologies) and maintained in the range of 175 to 225 microamperes by addition of aqueous hydrofluoric acid. Bath solids were monitored by a Mettler® HR73 Moisture Analyzer and maintained in the range of 5.5% to 6.5% by addition of additional pigment fine particle dispersion obtained from Example 14.

Coating Sequence:

A 4"×5" ACT cold rolled steel panel was immersed for 120 seconds in Autophoretic®ACL 2592 cleaner at 80° C., followed by a 60-second tap rinse and 60-second deionized water rinse. The panels were immersed in the autodepositing coating bath of example D for 120 seconds under ambient conditions followed by a 30-second dwell (i.e. the panel is raised out of the bath and allowed to drip for 30 seconds in air). The panel was then immersed for 60-seconds in E3 Autophoretic® reaction rinse at 50° C.±2° C. (E3 Autophoretic reaction rinse is available from the Surface Technologies Division of Henkel Corporation). The panels were flashed in an oven for 5-minutes at 53° C. and then cured at 185° C. for 40 minutes.

Film Characteristics:

| | |
|---|---|
| Film Build | 0.6–1.0 mil |
| Tap Adhesion (ASTM D3359, method B) | 5 B |
| 240 hour Water Immersion (ASTM D870) | 5 B/10 |
| 504 hour NSS (ASTM B117) | 8.8 mm in total creep |
| 30 cycles SAE J2334 | 4.7 mm in total creep |
| 30 cycles GM9540P | 5.2 mm in total creep |
| Reverse Impact (ASTM D794) | 160 in-lb |

EXAMPLE 21

Processing Panels through the Autodepositing Coating Bath of Example 15

Operation and Control Conditions for the Coating Bath:

The redox value of the autodepositing coating bath of example 15 was maintained in the range of 300 mv to 450 mv by addition of hydrogen peroxide. Free fluoride ion level was monitored by a Lineguard® 101 meter (available from Henkel Surface Technologies) and maintained in the range of 175 to 225 microamperes by addition of aqueous hydrofluoric acid. Bath solids were monitored by a Mettler® HR73 Moisture Analyzer and maintained in the range of 5.5% to 6.5% by addition of additional pigment fine particle dispersion obtained from Example 15.

Coating Sequence:

A 4"×5" ACT cold rolled steel panel was immersed for 120 seconds in Autophoretic®ACL 2592 cleaner at 80° C., followed by a 60-second tap rinse and 60-second deionized water rinse. The panels were immersed in the autodepositing coating bath of example D for 120 seconds under ambient conditions followed by a 30-second dwell (i.e. the panel is raised out of the bath and allowed to drip for 30 seconds in air). The panel was then immersed for 60-seconds in E3 Autophoretic® reaction rinse at 50° C.±2° C. (E3 Autophoretic reaction rinse is available from the Surface Technologies Division of Henkel Corporation). The panels were flashed in an oven for 5-minutes at 53° C. and then cured at 185° C. for 40 minutes.

Film Characteristics:

| | |
|---|---|
| Film Build | 0.7–1.0 mil |
| Tap Adhesion (ASTM D3359, method B) | 5 B |
| 240 hour Water Immersion (ASTM D870) | 5 B/10 |
| 504 hour NSS (ASTM B117) | 6.2 mm in total creep |
| 30 cycles SAE J2334 | 4.7 mm in total creep |
| 30 cycles GM9540P | 3.8 mm in total creep |
| Reverse Impact (ASTM D794) | 20 in-lb |

It will be apparent to those skilled in the art that various modifications and variations can be made in the compositions of the present invention and in the process of making the epoxy-acrylic dispersion and the coating bath without departing from the scope or spirit of the invention.

Other embodiments of the invention will be apparent to those skilled in the art from consideration of the specification and practice of the invention disclosed herein. It is intended that the specification and examples be considered as exemplary only.

What is claimed is:

1. A process for making an autodepositing epoxy-based dispersion, the process comprising the steps of:
   (a) dissolving and/or reducing an epoxy pre-polymer with at least one ethylenically unsaturated monomer to form a mixture wherein the at least one ethylenically unsaturated monomer is an anionic functional monomer;
   (b) dispersing the mixture of step (a) in water with at least one surfactant to form a fine particle dispersion; and
   (c) polymerizing the at least one ethylenically unsaturated monomer contained in the fine particle dispersion to form an epoxy dispersion,
   wherein at least one water soluble initiator and/or at least one organic soluble initiator is added prior to step (c) and wherein at least one latent curing agent is incorporated into the mixture before the at least one ethylenically unsaturated monomer is polymerized.

2. The process of claim 1, wherein step (b) comprises the steps of:
   dispersing the mixture of step (a) in water with the at least one surfactant to form a crude dispersion; and
   mechanically dispersing the crude dispersion to form a fine particle dispersion.

3. The process of claim 1, wherein at least one water-soluble initiator is added after step (a) and prior to step(c) and/or at least one organic soluble initiator is added before step (b).

4. The process of claim 1, wherein step (c) is carried out by heating the fine particle dispersion.

5. The process of claim 1, wherein the epoxy pre-polymer is derived from epoxy resin prepared by reacting a diglycidyl ether of a polyhydric phenol.

6. The process of claim 1, wherein the epoxy pre-polymer is derived from one or more epoxy resins conforming to the general chemical structure:

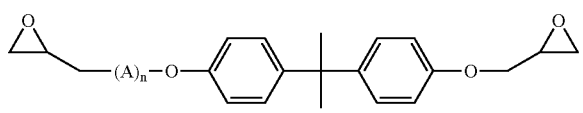

wherein A is

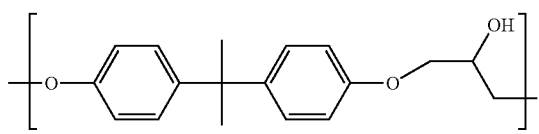

and n is 0 or an integer from 1 to 50.

7. The process of claim 1, wherein at least one further component is added prior to step (c), wherein the at least one further component is selected from the group consisting of curing agents, coalescing solvents, level agents, and mixtures thereof.

8. The process of claim 1, wherein the anionic functional monomer is select from the group consisting of 2-sulfoethyl methacrylate, 2-acrylamido-2-methylpropanesulfonic acid, styrenesulfonic acid, and vinylphosphonic acid.

9. The process of claim 1, wherein the anionic functional monomer is a phosphate ester monomer.

10. An stable autodepositing epoxy dispersion produced according to the process of claim 1.

11. An autodepositing coating composition comprising:
(a) at least one epoxy dispersion produced by the process of claim 1;
(b) water; and
(c) at least one autodeposition accelerator.

12. A process for making an autodepositing epoxy-based dispersion, the process comprising the steps of:
(a) dissolving and/or reducing an epoxy pre-polymer with at least one ethylenically unsaturated monomer to form a mixture;
(b) dispersing the mixture of step (a) in water with at least one surfactant to form a fine particle dispersion; and
(c) polymerizing the at least one ethylenically unsaturated monomer contained in the fine particle dispersion to form an epoxy dispersion,
wherein at least one water soluble initiator and/or at least one organic soluble initiator is added prior to step (c) and at least one phosphate ester monomer is added after step (b) and prior to or during step (c).

13. The process of claim 12, wherein step (b) comprises the steps of:
dispersing the mixture of step (a) in water with the at least one surfactant to form a crude dispersion; and
mechanically dispersing the crude dispersion to form a fine particle dispersion.

14. The process of claim 12, wherein at least one water-soluble initiator is added after step (a) and prior to step (c) and/or at least one organic soluble initiator is added before step (b).

15. The process of claim 12, wherein step (c) is carried out by heating the fine particle dispersion.

16. The process of claim 12, wherein the epoxy pre-polymer is derived from epoxy resin prepared by reacting a diglycidyl ether of a polyhydric phenol.

17. The process of claim 12, wherein the epoxy pre-polymer is derived from one or more epoxy resins conforming to the general chemical structure:

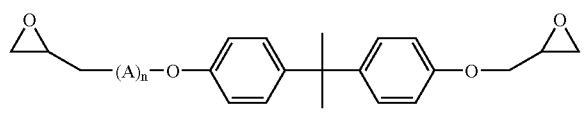

wherein A is

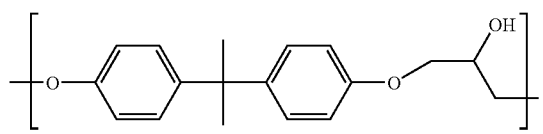

and n is 0 or an integer from 1 to 50.

18. The process of claim 12, wherein at least one further component is added prior to step (c), wherein the at least one further component is selected from the group consisting of curing agents, coalescing solvents, level agents, and mixtures thereof.

19. A stable autodepositing epoxy dispersion comprising
(a) an epoxy pre-polymer;
(b) at least one ethylenically unsaturated monomer polymerized through a heterophase polymerization process; and
(c) at least one latent curing agent,
wherein the epoxy dispersion further comprises dispersion particles and components (a), (b), and (c) are all present in one or more of the dispersion particles and the at least one ethylenically unsaturated monomer is an anionic functional monomer.

20. The stable autodepositing epoxy dispersion of claim 19, wherein the epoxy pre-polymer is derived from epoxy resin prepared by reacting a diglycidyl ether of a polyhydric phenol.

21. The stable autodepositing epoxy dispersion of claim 19, wherein the epoxy pre-polymer is derived from one or more epoxy resins conforming to the general chemical structure:

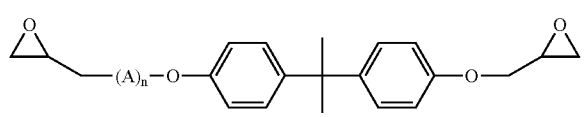

wherein A is

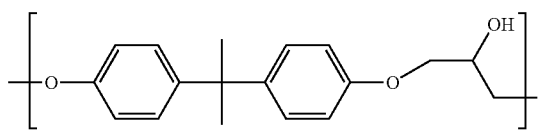

and n is 0 or an integer from 1 to 50.

22. The stable autodepositing epoxy dispersion of claim 19, further comprising at least one further component selected from the group consisting of colorants, pigments, coalescing solvents, level agents, and mixtures thereof.

23. The stable autodepositing epoxy dispersion of claim 19, wherein the anionic functional monomer is select from the group consisting of 2-sulfoethyl methacrylate, 2-acrylamido-2-methylpropanesulfonic acid, styrenesulfonic acid, and vinylphosphonic acid.

24. The stable autodepositing epoxy dispersion of claim 19, wherein the anionic functional monomer is a phosphate ester monomer.

25. A stable autodepositing epoxy dispersion comprising
(a) an epoxy pre-polymer; and
(b) at least one ethylenically unsaturated monomer polymerized through a heterophase polymerization process, wherein at least one ethylenically unsaturated monomer is a phosphate ester monomer,
and further wherein the epoxy dispersion further comprises dispersion particles and components (a) and (b) are both present in one or more of the dispersion particles.

26. The autodepositing epoxy dispersion of claim 25, wherein the epoxy pre-polymer is derived from epoxy resin prepared by reacting a diglycidyl ether of a polyhydric phenol.

27. The autodepositing epoxy dispersion of claim 25, wherein the epoxy pre-polymer is derived from one or more epoxy resins conforming to the general chemical structure:

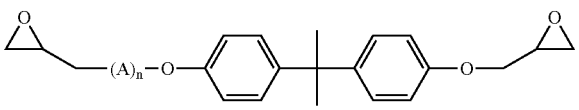

wherein A is

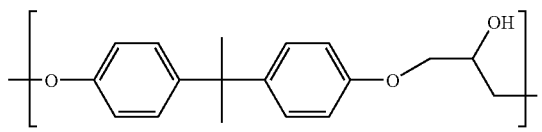

and n is 0 or an integer from 1 to 50.

28. The autodepositing epoxy dispersion of claim 25, further comprising at least one further component selected from the group consisting of curing agents, colorants, pigments, coalescing solvents, level agents, and mixtures thereof.

29. The autodepositing epoxy dispersion of claim 25, further comprising at least one latent curing agent, wherein components (a), (b), and the at least one latent curing agent are all present in one or more of the dispersion particles.

30. An autodepositing coating composition comprising:
(a) at least one epoxy dispersion comprising: (i) an epoxy pre-polymer; (ii) at least one ethylenically unsaturated monomer polymerized through a heterophase polymerization process; and (iii) at least one latent curing agent, wherein the epoxy dispersion further comprises dispersion particles and components (i), (ii), and (iii) are all present in one or more of the dispersion particles;
(b) water; and
(c) at least one autodeposition accelerator.

31. The autodepositing coating composition of claim 30, wherein the epoxy pre-polymer is derived from epoxy resin prepared by reacting a diglycidyl ether of a polyhydric phenol.

32. The autodepositing coating composition of claim 30, wherein the epoxy pre-polymer is derived from one or more epoxy resins conforming to the general chemical structure:

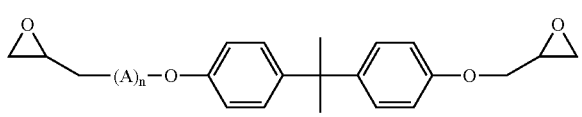

wherein A is

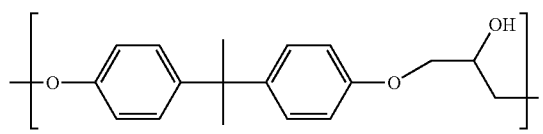

and n is 0 or an integer from 1 to 50.

33. The autodepositing coating composition of claim 30, further comprising at least one further component selected from the group consisting of colorants, pigments, coalescing solvents, level agents, and mixtures thereof.

34. The autodepositing coating composition of claim 30, wherein the at least one ethylenically unsaturated monomer is selected from the group consisting of acrylic acid, methacrylic acid, esters of acrylic acid, esters of methacrylic acid, acrylonitrile, methacrylonitrile, acrylamide, methacrylamide, and styrene.

35. The autodepositing coating composition of claim 30, wherein the at least one ethylenically unsaturated monomer is an anionic functional monomer.

36. An autodepositing coating composition comprising:
(a) at least one epoxy dispersion comprising (i) an epoxy pre-polymer and (ii) at least one ethylenically unsaturated monomer polymerized through a heterophase polymerization process, wherein the epoxy dispersion further comprises dispersion particles and components (i) and (ii) are both present in one or more of the dispersion particles;
(b) water; and
(c) at least one autodeposition accelerator.

37. The autodepositing epoxy-acrylic coating composition of claim 36, wherein at least one of the ethylenically unsaturated monomers is a phosphate ester monomer.

38. The autodepositing coating composition of claim 37, wherein the epoxy pre-polymer is derived from epoxy resin prepared by reacting a diglycidyl ether of a polyhydric phenol.

39. The autodepositing coating composition of claim 37, wherein the epoxy pre-polymer is derived from one or more epoxy resins conforming to the general chemical structure:
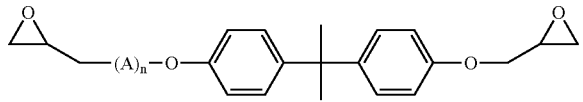
wherein A is
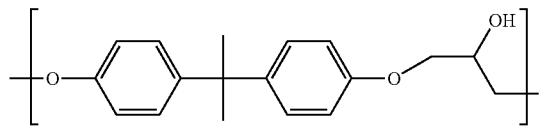
and n is 0 or an integer from 1 to 50.
* * * * *